United States Patent
Ghosh et al.

(10) Patent No.: US 7,067,568 B1
(45) Date of Patent: Jun. 27, 2006

(54) PROCESS OF PREPARATION OF BIODEGRADABLE FILMS FROM SEMI REFINED KAPPA CARRAGEENAN

(75) Inventors: Pushpito Kumar Ghosh, Gujarat (IN); Arup Kumar Siddhanta, Gujarat (IN); Kamalesh Prasad, Gujarat (IN); Ramavatar Meena, Gujarat (IN); Amit Bhattacharya, Gujarat (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 11/003,250

(22) Filed: Dec. 3, 2004

(51) Int. Cl.
*C09J 3/215* (2006.01)
*C09J 3/18* (2006.01)
*C09J 11/02* (2006.01)
*C09J 11/08* (2006.01)

(52) U.S. Cl. .................. 524/55; 106/205.72; 536/114; 536/128

(58) Field of Classification Search .................. 524/55; 106/205.72; 536/114, 128
See application file for complete search history.

(56) References Cited

U.S. PATENT DOCUMENTS

| 2,375,259 | A |   | 5/1945  | Stoyle |
|-----------|---|---|---------|--------|
| 3,907,770 | A |   | 9/1975  | Strong |
| 5,089,307 | A | * | 2/1992  | Ninomiya et al. .......... 428/35.2 |
| 5,201,946 | A | * | 4/1993  | Marsek .................. 106/205.72 |
| 5,270,358 | A | * | 12/1993 | Asmus ........................ 524/55 |
| 5,801,240 | A | * | 9/1998  | Rideout et al. ............. 536/128 |
| 6,030,641 | A | * | 2/2000  | Yamashita et al. .......... 424/451 |
| 6,214,376 | B1| * | 4/2001  | Gennadios ................. 424/451 |

FOREIGN PATENT DOCUMENTS

| EP | 0 400 484 | 12/1990 |
|----|-----------|---------|
| FR | 2 216 299 | 8/1974  |
| WO | 98/40412  | 9/1998  |
| WO | 02/48199  | 6/2002  |
| WO | 03/059957 | 7/2003  |

OTHER PUBLICATIONS

DERWENT Abstract of JP 63 164858 dated Jul. 8, 1988 XP-002335160.
DERWENT Abstract of JP 05 001198 dated Jan. 8, 1993 XP-002335243.

* cited by examiner

*Primary Examiner*—David Brunsman
(74) *Attorney, Agent, or Firm*—Ladas and Parry LLP

(57) ABSTRACT

The present invention relates to use of inexpensive semi-refined kappa carrageenan as a seaweed polysaccharide in preparation of tough, biodegradable films exhibiting improved performance over films obtained from refined kappa carrageenan. The formulation requires no gelling salt and the only other essential components of the film are glycerol and water, the former being used as plasticizer as reported in the prior art. The films can be recycled and reprocessed if required. The performance of the films can be further enhanced by incorporating polyvinyl alcohol that lends toughness and clarity as also natural rubber latex that imparts greater elasticity and barrier properties. Films of optimum composition can be pulse heat sealed immediately after casting and used for preparation of soft capsules and pouches. It is possible to store solvents and oils in the pouches. In view of the more eco-friendly processing of semi-refined kappa carrageenan compared to refined kappa carrageenan, films made with the former would also effectively be "greener".

47 Claims, No Drawings

PROCESS OF PREPARATION OF BIODEGRADABLE FILMS FROM SEMI REFINED KAPPA CARRAGEENAN

FIELD OF THE INVENTION

The present invention relates to seaweed polysaccharide based films. More specifically, the invention relates to the preparation of heat sealable biodegradable films utilizing semi-refined kappa carrageeenan as the film forming raw material that is inexpensive, eco-friendly, and dispenses with the use of gelling salt.

BACKGROUND OF THE INVENTION

In the mid-1990s, the outbreak of Bovine Spongiform Encephalopathy (BSE) or "mad cow" disease in Europe drew global attention. Subsequently, it has brought about a major change in safety perception in the areas of human, cattle and poultry health and welfare. Accordingly, the US Food and Drug Administration (FDA) advisory committee recommended that "gelatin" should no longer be considered generally recognized as safe (GRAS) for either food or pharmaceutical products. Consequently, attempts have been under way to identify alternatives to animal gelatin for use in soft capsules and edible applications. This would also have an important bearing on strict vegetarians.

Reference is made to several reports on development of biodegradable packaging.

Reference is made to D. Cade, R. Scott and X. He, who report non-animal film compositions suitable for film forming, particularly hard and soft capsules, comprising water soluble cellulose ethers, hydrocolloids (gellan gum etc.) and sequestering agents which include: ethylenediamine tetraacetic acid, lactic acid, citric acid, lecithin, beta-cyclodextrin, dihydroxyethylglycine etc. (U.S. Pat. No. 6,517,865; Feb. 11, 2003). They have referred to EP 0714656 describing a composition of cellulose ether, carrageenan and KCl. Apart from the fact that the formulation is complex, use is made of KCl as gelling salt which can adversely affect film properties if such salt crystallizes from the solution.

Reference is made to "Non-gelatin substitutes for oral delivery capsules, their composition and process of manufacture" of A. Gennadios et al (U.S. Pat. No. 6,214,376; Aug. 25, 1998) wherein κ-carrageenan is used along with dextrin to form a gelled composition (usually a film) enclosing active ingredients, which is water-soluble. The main limitations of the invention are that the formulation is too complex and a gelling salt is required which makes casting of the film considerably more difficult and can adversely affect the film quality.

Reference is made to Sadaji Yamashita (Kanagawa-ken, JP) and Seiki Harada (Kanagawa-ken, JP) which describes production of sustained release capsule and method for preparation thereof using seaweed polysaccharides (alginate and carrageenan) besides other gums produced from terrestrial plants along with polyhydric alcohols (U.S. Pat. No. 6,030,641; Appl. No.: 080374; Filed: May 12, 1998). The main limitation is the necessity of using alkali and multiple gums in the formulation.

Hirofumi Ninomiya, Shoji Suzuki, and Kazuhiro Ishii of Mitsubishi Rayon Co., Ltd. (Tokyo, JP) have reported "Edible film and method of making same" wherein they have reported the preparation of a multilayer heat-sealable edible film comprising (a) a film layer comprising a water-soluble polysaccharide as the principal component wherein the water-soluble polysaccharide is composed chiefly of carrageenan, a polyhydric alcohol and water, and (b) a subfilm layer formed on at least one surface of the film layer, the subfilm layer containing an alkali metal salt of casein, soybean protein or a combination of soybean protein and gelatin, as the principal component. The water soluble polysaccharide used is mainly carrageenan and more particularly kappa carrageenan as evident from the examples, but the film layer requires, apart from carrageenan, at least one member from the group consisting of alginic acid and its salts, furcellaran, agar, pectin, etc. The prior art makes no reference to use of high molecular weight polyvinyl alcohol and natural rubber latex to increase clarity and strength of the films. The prior art also does not indicate any application of the film for the purpose of packaging fluids such as vegetable oil and organic solvents or for the preparation of soft capsule material. Most importantly, apart from the more complex nature of the formulation, the main drawback of the prior art is that it fails to take advantage of semi-refined kappa carrageenan of the present invention and, instead, uses solid potassium kappa carrageenan which would be both costlier and less environmentally friendly to prepare.

Mention has been made of Konjac (glucomannan), a gelling and thickening agent, being a powerful film former—both alone and in combinations with other gums such as carrageenan (www.Glucomannan.com, 2002).

Edward, Zbygniew and Nowak have described production of capsules comprising thermoplastic film of foamed modified cellulose material, preferably hydroxypropylmethyl cellulose. The foamed material dissolves rapidly in the mouth of the consumer, releasing the capsule contents into the consumer's mouth. (Bioprogress Technology International, Inc., UK. PCT Int. Appl. WO 2002003968 A1 17 Jan. 2002, 10 pp. (Chemical Abstracts, 2002, 136:90996).

Sun Y. Park et al reported the production of biopolymer composite films based on κ-carrageenan and chitosan in presence of various organic hydroxy acids (e.g. citric, ascorbic and malic acids) as well as a plasticizer, and studied the properties of the films (*Materials Research Bulletin* 36:511–519, 2001). No mention is made of any film that is based on κ-carrageenan alone. Dong Su Cha et al. described the preparation of antimicrobial films based on Na-alginate and κ-carrageenan. They studied the antimicrobial activity, tensile strength and elongation properties of the films (*Lebensmittel-Wissenchaft und-Technologie* 35:715–719, 2002). No mention is made of any film that is based on κ-carrageenan alone.

Reference is also made to the studies of K. Nakamura et al describing the thermal properties (DSC) of water insoluble alginate films in presence of di- and trivalent cations (e.g. Cu (II), Al (III) and Fe (III)), which were used to replace the sodium (I) ion in sodium alginate (*Thermochemica Acta* 267:343.353, 1995). Mention may be made of polyethylene glycol alginate based microcapsules for oral delivery of hirudin (T. Chandy et al. *J. Appl. Polymer. Sci.* 70:2143–2153, 1998). Microcapsules derived from polyelectrolyte complexes of sodium alginate with chitosan have been described by K. Y. Lee et al. (*J. Appl. Polym. Sci.* 63:425–432, 1997).

K. Nakamura et al. described the results of their studies of thermal properties (DSC) of water insoluble alginate films in presence of di- and trivalent cations (e.g. Cu (II), Al (III) and Fe (III)) which were used to replace the sodium (I) ion in sodium alginate (*Thermochemica Acta* 267:343–353, 1995).

Reference is made to "Industrial Gums; Polysaccharides and their Derivatives" edited by R. L. Whistler and J. N. BeMiller, Academic Press, New York 1993 wherein on p. 152 it is stated that "most carrageenan is precipitated from solution by addition of an alcohol, normally 2-propanol, giving a fibrous carrageenan coagulum that is separated and pressed to remove residual moisture. Alcohol is recovered by distillation." As is known to those skilled in the art, large volumes of alcohol are required for precipitation due to the low concentration of carrageenan in the aqueous solution. Hence the preparation of such carrageenan is not eco-friendly. In the alternative method of pressure syneresis, capital investment is very high. Reference is made to the same book by Whistler and BeMiller wherein it is stated on p 151 that a low cost semi-refined seaweed can be obtained "from *Eucheuma* sp., especially *E. cottonii*, by treating this seaweed with concentrated KOH solution for a short time at elevated temperature, then washed." The resulting seaweed is then dried, ground and sold as low-cost semi-refined seaweed for non-food gelling applications." It is further stated that as of 1991 this product has also been used in food applications. No reference is made to any application of such semi-refined carrageenan for film preparation. Such carrageenan, as will be evident from the process, is produced in eco-friendly manner, wherein alkaline effluent can be recycled after topping up with additional KOH.

It is known that whereas refined kappa carrageenan as obtained above is suitable for film formation, semi-refined kappa carrageenan, however, contains as much as 20–30% of plant debris which would be deleterious to film properties.

The major drawbacks of the prior art are the complex nature of the formulations and the poor tensile strength of films in several cases. There are no reports wherein kappa-carrageenan has been used alone as film forming material. It is further evident from the prior art that kappa carrageenan was used directly in refined form with or without alkali metal salts as gelling agent and no evidence is available of the use of semi-refined kappa carrageenan which, although it does not have the simplicity of use of refined potassium kappa caragenan, has the virtue of being both less expensive and more eco-friendly to produce, without sacrificing in any manner the quality of the films prepared therefrom as per the present invention.

U.S. Pat. No. 6,358,580 (Mar. 19, 2002; M Thomas et al) describes a method for the production of foamed sealing compositions out of synthetic and natural polymers and elastomeric additives including vulcanized natural rubber. No mention is made of the use of natural rubber latex.

In Indian Patent No. 168957 dated Jul. 10, 1989, P. Mitra et al. have described the use of elastomeric additives for improving the rheology of water-in-oil emulsion explosive formulations. Use of natural rubber latex has been reported therein.

No application has been reported in the prior art of the use of seaweed polysaccharide films as biodegradable packaging material for storage of non-aqueous fluids.

OBJECTS OF THE INVENTION

The main object of the invention is to produce biodegradable heat sealable films using semi-refined kappa carrageenan as the film forming material, thereby resulting in an eco-friendly and inexpensive process.

Another object of the invention is to provide process for production of biodegradable films using a film forming substance that itself is processed by eco-friendly method.

Another object of the invention is to provide a process for the production of biodegradable films using a film forming material without compromising on film quality.

It is another object of the invention to provide a process for the production of biodegradable films where the formulation preparation is simplified.

It is another object of the invention to provide a process for the production of biodegradable films wherein semi-refined kappa carrageenan is obtained suitable for use at film manufacturer's end.

It is another object of the invention to provide a process for the production of biodegradable films that dispenses with the use of gelling salt.

It is another object of the invention to provide a process for the production of biodegradable films using glycerol obtained from vegetable triglycerides as plasticizer to yield coherent, flexible films as reported in the prior art.

Another object of the invention is to provide process for production of biodegradable films using polyvinyl alcohol to increase the tensile strength and clarity of the film.

It is another object of the invention to provide a process for the production of biodegradable films using natural rubber latex in trace quantities to enhance the strength, elasticity and moisture resistance of the film.

It is another object of the invention to provide a process for the production of biodegradable films using a surfactant to facilitate homogenous mixing of natural rubber latex in the formulation.

It is another object of the invention to provide a process for the production of biodegradable films wherein the composition of formulation for film casting is optimized.

It is another object of the invention to provide a process for the production of biodegradable films under hot conditions.

Another object of the invention is to provide for the production of biodegradable films by casting films on polypropylene sheets or on a rotating stainless steel drum.

It is another object of the invention to provide a process for the production of biodegradable films, wherein the films can be sealed immediately after casting.

It is another object of the invention to provide a process for the production of biodegradable films, wherein the films can be processed into soft capsules dispensing with the use of animal gelatin.

It is another object of the invention to provide pouches that can be used as packaging material made of biodegradable thin films.

It is another object of the invention to provide a process for the production of biodegradable films wherein the defective films can be recycled by converting into sol.

SUMMARY OF THE PRESENT INVENTION

The present invention seeks to improve the attractiveness of kappa carrageenan as biodegradable film forming material by utilizing low cost semi-refined kappa carrageenan (SRC) as the raw material which has the added advantage of being processed in more eco-friendly manner and possessing potassium ion as the counter ion for sulphate residue, that, in turn, enables the gelling salt normally required for gel formation to be dispensed with, and yet allowing films of high tensile strength to be produced. The strength and quality of the films can be further augmented by incorporation of PVA as an additive that improves film clarity, glycerol as the well known plasticizer, and natural rubber latex as an additive that enhances strength and improves barrier properties. The invention further seeks to exploit the high tensile strength of the present films for preparation of soft capsules and pouches. The pouches can be used for packaging of non-aqueous fluids or can be hydrophobised to make them suitable for storage of aqueous fluids and to prevent accidental degradation of the film on exposure to water.

Accordingly, the invention involves: (i) heating semi-refined carrageenan in water to obtain a crude sol, (ii) centrifuging under hot condition to remove debris and obtain purified semi refined carrageenan as the main film forming material in the form of a clear sol, (iii) boiling to concentrate the sol in an open pan evaporator, (iv) adding glycerol into the formulation as a plasticiser, (v) adding polyvinyl alcohol in solution form into the formulation to increase transparency and toughness, (vi) adding natural rubber latex as a dilute solution into the formulation to improve elasticity and barrier properties; (vii) casting film from hot sol on a conventional casting machine or on a rotating drum, (viii) utilizing the film for diverse applications including preparation of soft capsule, pouches and overhead transparency sheets, (ix) recycling rejected films by converting back into sol.

In an embodiment of the invention semi-refined kappa carrageenan having gel strength 650 g/cm$^2$ (measured in 1% carrageenan gel in 1% KCl at 30° C.) is used.

In another embodiment of the invention 5% aqueous solution (w/w) of semi refined kappa carrageenan is prepared by boiling in an autoclave at 110° C. (15 psi) for 20 min.

In another embodiment of the invention the quantity of glycerol taken is 50%–150% of the weight of kappa carrageenan.

In another embodiment of the invention the debris in the semi refined kappa carrageenan is removed by centrifugation at 10000 rpm at 80–85° C. for 10 min and estimated to be ca. 20%, i.e., a sol containing 5% SRC ultimately contains 4% kappa carrageenan.

In another embodiment of the invention the clarified sol having 4% carrageenan content is concentrated in an open pan evaporator to increase carrageenan concentration in the range of 8–12%.

In another embodiment of the invention polyvinyl alcohol of MW 14,000 was added along with glycerol to improve the strength and clarity of the film, the amount of PVA being 50%–150% wrt the weight of kappa carrageenan.

In another embodiment of the invention optionally along with glycerol and/or PVA, natural rubber latex is added to the sol to the extent of 0.5–1.5% (w/w) w.r.t. kappa carrageenan.

In another embodiment of the invention glycerol is added into the sol under hot condition expelling all dissolved air.

In another embodiment of the invention, rubber latex is added into a 4% (w/v) aqueous solution of sodium lauryl sulphate and the solution was then added into the hot sol in a ratio of 1:9.

In another embodiment of the invention films are cast at 80–85° C. on a prototype casting machine.

In another embodiment of the invention the film is peeled and dried in flat condition at room temperature (30° C.) to attain desired moisture level (65–20%).

In another embodiment of the invention films prepared are 100 cm long, 10 cm wide, and 0.18–0.28 mm thick.

In another embodiment of the invention the films have tensile strength 45 to 170 kg/cm$^2$ and elongation of 77 to 292% for films containing 8–10% moisture.

In another embodiment of the invention the films have similar tensile strength and % elongation both along length and breadth.

In another embodiment water vapour permeability reduced from (0.008–0.009 gcm$^{-2}$ h$^{-1}$.bar) to (0.003–0.005 gcm$^{-2}$ h$^{-1}$.bar) on incorporation of natural rubber latex.

In another embodiment of the invention one surface of the film is treated with a cross-linking agent that makes the surface hydrophobic.

In another embodiment of the invention pouches are sealed by pulse heat sealing at 100° C.

In another embodiment of the invention, heat sealing is facilitated by locally applying glycerol in the sealing area.

In another embodiment of the invention a variety of non aqueous fluids such as vegetable oils, acetone, dichloromethane, and hexane are storable in the pouches for several days with only marginal loss of weight in case of the volatile solvents.

DETAILED DESCRIPTION OF THE INVENTION

The present invention seeks to improve the attractiveness of kappa carrageenan as biodegradable film forming material by utilizing low cost semi-refined kappa carrageenan (SRC) as the raw material. This has the added advantage of being processed in more eco-friendly manner and possessing potassium ion as the counter ion for sulphate residue, that, in turn, enables the gelling salt normally required for gel formation to be dispensed with, and yet allowing films of high tensile strength to be produced. The strength and quality of the films can be further augmented by incorporation of PVA as an additive that improves film clarity, glycerol as the well known plasticizer, and natural rubber latex as an additive that enhances strength and improves barrier properties. The invention further seeks to exploit the high tensile strength of the present films for preparation of soft capsules and pouches. The pouches can be used for packaging of non-aqueous fluids or can be hydrophobised to make them suitable for storage of aqueous fluids and to prevent accidental degradation of the film on exposure to water.

The process of the invention comprises (i) heating semi-refined kappa carrageenan in water to obtain a crude sol; (ii) centrifuging the sol under hot condition to remove debris and obtain purified semi refined carrageenan in the form of a clear sol; (iii) concentrating the clear sol by boiling in an open pan evaporator to obtain a concentrated formulation; (iv) adding a plasticizer comprising glycerol to the formulation to obtain a formulated sol; and then (v) casting a film from the formulated sol.

If the film obtained is defective due to presence of, for example, air bubbles, it can be recycled after conversion into a sol. The semi-refined kappa carrageenan is obtained by washing dry *Kappaphycus alvarezii* with water followed by cooking with 8% (w/v) KOH at a temperature in the range of 75–80° C. for a time period of about 3 hours, followed by recycling excess KOH to a subsequent batch after making up strength of KOH, and washing off residual KOH from product obtained, to obtain semi-refined kappa carrageenan with a gel strength in the range of 500–650 g/cm$^2$ at 30° C. when measured in 1% semi-refined kappa carrageenan in 1% KCl.

The sol is prepared at a temperature in the range of 80–120° C. and in a time range of 5 to 30 minutes. The concentration of the semi-refined kappa carrageenan in step (i) of the process is preferably in the range of 1.5 to 15%. In step (ii) the hot sol having temperature in the range 70–100° C. is centrifuged at 1000–10000 rpm either in a batch or continuous centrifuge. The centrifugation yields both a clear sol as well as debris containing adhering sol, which is recycled to a next batch or utilized as soil conditioner.

The clear sol containing purified semi-refined kappa carrageenan is concentrated to a concentration of 4–16% for film casting and more particularly to a concentration of 8–12% to achieve heat sealing immediately after film casting. The use of purified semi-refined kappa carrageenan obviates the use of a gelling salt.

Glycerol is heated to a temperature in the range of 50–100° C. prior to addition into hot sol in step (iv) and the weight ratio of glycerol to purified semi-refined kappa carrageenan is 0.5–3.0 and more particularly 1.8–2.2 to achieve desired film flexibility, non-brittle nature and efficient sealing immediately after film casting. If desired, polyvinyl alcohol in solution form is added into the formulation obtained in step (iv) in order to increase transparency and toughness. The molecular weight of polyvinyl alcohol added is in the range of 10000–20000 and the weight ratio of polyvinyl alcohol to purified semi-refined kappa carrageenan is 0.0–2.0. If desired, natural rubber latex is added either with or before addition of glycerol or polyvinyl alcohol and in the form of a dilute solution into the formulation to improve elasticity and barrier properties. The natural rubber latex is preferably added in concentration in the range of 15–25% to dilute ammonia and is then further diluted 20–100 fold by adding to an aqueous solution containing 1–10% of an anionic surfactant comprising sodium lauryl sulphate and then warmed to a temperature of 50–60° C. prior to addition to hot sol. The ratio of rubber to purified semi-refined kappa carrageenan is in the range of 0.000–0.040.

A 5% aqueous solution (w/w) of semi refined kappa carrageenan is prepared by boiling in an autoclave at 110° C. (15 psi) for 20 min. As explained above, the debris in the semi refined kappa carrageenan was removed by centrifugation at 10000 rpm at 80–85° C. for 10 min and estimated to be ca. 20%, i.e., a sol containing 5% SRC ultimately contains 4% kappa carrageenan. The clarified sol having 4% carrageenan content was concentrated in an open pan evaporator to increase carrageenan concentration to a range of 8–12%. Preferably, the quantity of glycerol taken is in the range of 50%–150% of the weight of kappa carrageenan.

In another embodiment of the invention the glycerol is added into the sol under hot condition expelling all dissolved air. Polyvinyl alcohol of MW 14,000 was added along with glycerol to improve the strength and clarity of the film, the amount of PVA being 50%–150% with respect to the weight of kappa carrageenan. Optionally along with glycerol and/or PVA, natural rubber latex is added into the sol to the extent of 0.5–1.5% (w/w) with respect to the kappa carrageenan. Rubber latex was added into a 4% (w/v) aqueous solution of sodium lauryl sulphate and the solution was then added into the hot sol in a ratio of 1:9.

Films were cast at 80–85° C. on a prototype casting machine. The film is peeled and dried in flat condition at room temperature (30° C.) to attain desired moisture level in the range of 65–20%. The films prepared are 100 cm long, 10 cm wide, and 0.18–0.28 mm thick. And exhibit a tensile strength of 45 to 170 kg/cm² and elongation of 77 to 292% for film containing 8–10% moisture. An important advantage of the invention is that the film obtained has substantially similar tensile strength and % elongation along both the length and breadth.

The formulated sol is degassed prior to casting to avoid film defects due to trapped air bubbles. The temperature at which films are cast in step (v) is in the range of 50–100° C. and viscosity is in the range of 100–500 cp. The moisture content of the film immediately after casting in step (v) is in the range of 50–90% and more particularly 55–60% for heat sealing immediately after casting. The moisture content of films at the time of heat sealing is 10–60%. The thickness of films obtained is in the range of 50–2000 μm and the tensile strength of films is in the range of 100–1000 kgf/cm² and % elongation is in the range of 50–350%. The water vapour permeability of the thin films is in the range of 0.01–0.15 kg/m²/h.bar.

The film obtained is non-tacky, odorless, and colorless and the % transmittance of light of 610 nm frequency is in the range of 10–99% depending on formulation and thickness. The water vapour permeability of the film was reduced from a range of 0.008–0.009 gcm$^{-2}$ h$^{-1}$.bar to a range of 0.003–0.005 gcm² h$^{-1}$.bar by incorporation of natural rubber latex therein. If desired, one surface of the film is treated with a cross-linking agent to make the surface hydrophobic.

The film obtained can be converted to a pouch by pulse heat sealing at 100° C. During heat sealing glycerol is applied locally to a sealing area. In another embodiment of the present invention a variety of non aqueous fluids such as vegetable oils, acetone, dichloromethane, and hexane could be stored in the pouches for several days with only marginal loss of weight in case of the volatile solvents.

Inventive Steps

1. Recognition that inexpensive and eco-friendly semi-refined kappa carrageenan (SRC) can be upgraded by preparing a sol, centrifuging and using the clarified sol directly for further formulation suitable for film formation.
2. Recognition that the counter ion in semi refined carrageenan is potassium and that this may allow one to dispense with the requirement of the KCl gelling salt while improving film properties such as color, tensile strength and clarity.
3. Identifying suitable additives that can further improve clarity, strength, elasticity and barrier properties of the films.
4. Producing films that are immediately heat sealable after casting so as to make them amenable to continuous processing into finished product.

Semi-refined kappa carrageenan that was used in the film formulation had gel strength 650 g/cm² in 1% gel in 1% KCl at 30° C. Semi refined kappa carrageenan was prepared by using the method of prior art by treating the red seaweed Eucheuma cottonii which was cultivated by CSMCRI in the Gulf of Mannar (Bay of Bengal) with 8% KOH at 80° C. for 3 h. The semi-refined carrageenan was purified by clarifying the 5% solution by centrifugation (at 10000 rpm for 10 min at 80–85° C.). The clarified gel having 4% carrageenan content formed hard gel on cooling to room temperature (30° C.).

For comparison refined kappa carrageenan that was used for film preparation was prepared by using a method known in the prior are i.e. treating *Eucheuma cottonii* with Ca(OH)$_2$ at 107° C. (12 psi) for 1 hr followed by filtration and precipitation of the phycocolloid from the filtrate with isopropyl alcohol. A 4–5% aqueous solution (w/w) of this refined kappa carrageenan on cooling from 80° C. to room temperature (30° C.) formed a soft jelly. However, when KCl (1%, w/w) was added to the above solution, it formed a strong gel. Gel strength was measured at 30° C. using a Nikkansui-type gel tester (Kiya Seisakusho Ltd. Tokyo, Japan). Apparent viscosity was measured at 80° C. using a Brookfield viscometer (Synchroelectric viscometer, Stoughton, MASS 02072, U.S.A.).

The natural rubber latex (containing ≧20% rubber emulsion in ammonia solution; density 1.8 g/ml) was procured from M/s Padinjarekara Agencies, Kottayam, Kerala, India. Mechanical properties e.g. tensile strength and % elongation of the films were measured on a Shimadzu UTM machine (Model AG-100kNG) using the Winsoft Tensile and Compression Testing software taking 10 mm wide samples in a gauge length 10 mm. Data were taken in triplicates. Water vapour permeability was measured using the cup method (cf. S. Y. Park, H. J. Park, S. Q. Lin and Y. Sano; in Hydrocolloids, edited by K. Nishinari, Elsevier BV; 2000; pp. 199–202). Thickness of the films was measured using Digital Vernier calipers, Mitatoyo, Japan, taking an average of six random measurements. Transmittance of the films was measured at 610 nm on a Varian UV-vis-NIR Spectrophotometer using a clear Transparency Sheet (100 micron) as reference (cf. Olabarrieta, I.; Jansson, A.; Gedde, U. W.; Hedenqvist, M. S. International Journal of Polymeric Materials, 51(3), 275–289; 2002). Swelling properties of the film in water was measured by soaking the film in water and measuring the weight gain at regular intervals, and results are expressed in g of water uptake per g of dry film (nil moisture). Sealing of the films was done employing heat-pulse technique using a simple plastic bag sealing machine.

The following examples are given by way of illustration and, therefore, should not be construed to limit the scope of the present invention.

EXAMPLE 1

1 g of refined kappa carrageenan (containing 6% moisture) was taken in 100 ml water, mixed well and autoclaved at 110° C. (15 psi) for 20 min. This sol viscosity was 34 cP at 80° C. and the gel strength measured at 30° C. was <100 g cm$^{-2}$.

EXAMPLE 2

The experiment of Example 1 was repeated and 1.16 g of warm (50° C.) glycerol was added into the hot sol (80° C.). The sol viscosity was 20 cP at 80° C. and the gel strength measured at 30° C. was <100 g cm$^{-2}$.

EXAMPLE 3

The experiment of Example 1 was repeated except that 100 mL water was replaced with 100 mL of 1% KCl. The sol viscosity was 76 cP at 80° C. and the gel strength measured at 30° C. was 450±50 g cm$^{-2}$.

EXAMPLE 4

The experiment of Example 2 was repeated except that 100 mL water was replaced with 100 mL of 1% KCl. The sol viscosity was 66 cP at 80° C. and the gel strength measured at 30° C. was 380±50 g cm$^{-2}$.

EXAMPLE 5

The experiments of Examples 1–4 were repeated except that refined carrageenan was replaced with 1 g of semi-refined carrageenan (containing 8% moisture) prepared by first preparing a 5% sol of SRC in water, then centrifuging to remove debris, then drying to remove water and finally drying in the oven. Corresponding values of viscosity at 80° C. were: 95 cp, 80 cp, 118 cp and 90 cp, respectively, while gel strength values were 210±50 g cm$^{-2}$, 250±50 g cm$^{-2}$, 900±50 g cm$^{-2}$ and 780±50 g cm$^{-2}$, in the same sequence as in Examples 14.

Example 5 teaches that semi-refined carrageenan yields higher values of sol viscosity and gel strength than those obtained with refined carrageenan and the trend is maintained with/without KCl as also with/without glycerol.

EXAMPLE 6

Attempts were made to cast films from the hot (80° C.) sols of Examples 1–5. The sol viscosity was too low to cast films. Even where film formation was observed, the films were non-uniform in thickness and of poor quality.

EXAMPLE 7

The experiments of Examples 1–4 were repeated except that refined carrageenan quantity was 4 g instead of 1 g and glycerol quantity was 4.6 g instead of 1.16 g. The corresponding values of viscosity at 80° C. were: 300 cp, 280 cp, 560 cp and 380 cp, respectively, while the gel strength values were 530±50 g cm$^{-2}$, 500±50 g cm$^{-2}$, >1380 g cm$^{-2}$ and >1380 g cm$^{-2}$, in the same sequence as in Examples 1–4.

EXAMPLE 8

The experiments of Examples 1 and 2 were repeated taking purified semi-refined kappa carrageenan (as prepared in Example 5) in place of refined carrageenan. The quantity of semi-refined carrageenan was 4 g in both cases while the glycerol quantity was 4.6 g. The corresponding values of viscosity at 80° C. were: 375 cp and 305 cp, respectively, while the gel strength values were 1100±50 g cm$^{-2}$ and 1050±50 g cm$^{-2}$, in the same sequence as in Examples 1 and 3. It can be seen that the gel strength with 4% purified semi-refined carrageenan is >1000 g cm$^{-2}$ in presence of glycerol but without any added gelling salt unlike in the case of refined carrageenan for which the gel strength is only half this value.

EXAMPLE 9

5 g of refined carrageenan was taken in 100 ml of water and a sol prepared as described in Example 1. 5.8 g of warm glycerol was then added into the hot sol as described in Example 2. Attempts were made to cast films but no satisfactory film could be obtained.

EXAMPLE 10

5 g of refined carrageenan was taken in 100 ml of 1% KCl and a sol prepared as described in Example 2. 5.8 g of warm glycerol was then added to the hot sol as described in Example 4. Films were cast on a prototype casting machine on polypropylene sheet with two different thicknesses. The films were allowed to stand at room temperature (30° C.) for 2 h and then peeled. They were then left for a period of 2 months after which moisture content was estimated to be 8–10%. The film was translucent in appearance. Data on film thickness, clarity, tensile strength and % elongation are provided in Table 1 (Entries 1 and 2). Examples 9 and 10 teach that gelling salt is required for casting of films when refined carrageenan was used at 4% level along with glycerol. It is further evident that concentration of KCl builds up with evaporation of water from freshly cast films and ultimately exceeds the solubility of the salt, in turn causing salt crystallization which affects appearance and strength of the film.

EXAMPLE 11

5 g of semi refined kappa carrageenan was taken in 100 ml water and autoclaved at 110° C. (15 psi) for 20 min as described in Example 5. The hot sol was centrifuged at 10000 rpm at 80–85° C. for 10 min to remove insoluble matter. 80 g of clear sol containing 4% purified kappa carrageenan was obtained. 4.6 g of warm (50° C.) glycerol was then added into the sol and the contents autoclaved once again. Films were then cast with the hot sol as described in Example 10 above and stored under ambient conditions for 2 months. Compared to the films of Example 10, these films were more colorless and clearer in appearance. Film properties are shown in Table 1 (Entries 3 and 4) for two different thicknesses. When similar studies were attempted with semi-refined kappa carrageenan without carrying out centrifugation, the casting of films was more difficult and the films obtained were dirty looking, non-homogeneous and much weaker.

This example teaches that whereas semi-refined kappa carrageenan may not be used directly for film preparation, it can be used quite simply by centrifuging crude hot sol. The example teaches that films made from such sol containing purified semi-refined carrageenan and without gelling salt are superior in characteristic over those made from sols containing refined carrageenan and gelling salt, even when the absolute amount of carrageenan is 20% lower in the former case. Compared to the composition of Example 10, the possibility of salt crystallization is eliminated which would also therefore obviate the problems accompanying such crystallization.

EXAMPLE 12

Sol containing semi-refined carrageenan and glycerol was prepared as described in Example 11. Into this was added under stirring a warm (50° C.) solution of 4 g polyvinyl alcohol (PVA) (MW 14000) in 15 ml water. Two films were cast as described in Example 10. After storage under ambient conditions for 2 months, the films were found to be smooth and transparent, as also stronger than the films of Example 11. Details of the film properties are given in Table 1 (Entries 5 and 6). This example teaches that addition of PVA leads to overall improvement in film properties.

EXAMPLE 13

125 g of semi refined kappa carrageenan (125 g) was added into 2.5 L water and a sol was prepared as described in Example 5. 2.0 kg of clear sol, containing 4% of purified kappa carrageenan, was obtained after centrifugation followed by decantation. The sol was divided into two equal portions and water was removed in open pan evaporator to obtain 500 g of ca. 8% kappa carrageenan and, in the second case, 330 g of ca. 12% kappa carrageenan. 45 g and 50 g glycerol were added into the two hot sols, respectively, under stirring and these were then autoclaved as described above. Films were cast as before and both films were found to be amenable to pulse heat-sealing within 2.5 h of film formation. Moisture content of films produced from the compositions were 62–63% and 69–70% for 12% and 8% sols respectively.

This example teaches that films prepared from sols containing 8–12% purified semi-refined carrageenan can be heat sealed within 2–3 h of film formation.

EXAMPLE 14

12% hot 80l of Example 13 was used for preparing 5–7 m long, 12 cm wide and 1 mm thick films by spraying hot sol onto a drum and drawing the film from the drum. The films after 2–3 h of standing were used for preparing soft capsules on an encapsulation machine.

EXAMPLE 15

Into the hot sols containing 8% and 12% purified semi-refined kappa carrageenan prepared described in Example 13, 100 g and 83 g, respectively, of glycerol were added into the two sols under stirring and these were then autoclaved as described above. Films were cast on a Teflon sheet at 80° C. and these films were heat sealable immediately after casting.

Example 8 teaches that non-tacky films can be produced from sols of purified semi-refined carrageenan even when the carrageenan to glycerol weight ratio is as high as 1:2, and such films are sufficiently strong to be drawn into long films and can be heat sealed on a pulse heat sealing machine immediately after casting, thereby making the composition amenable to a continuous process.

EXAMPLE 16

Into the hot sol prepared as described in Example 10 containing refined kappa carrageenan, glycerol and KCl (5 g) was added under stirring 10 ml of an aqueous solution (50° C.) containing 0.35 ml of natural rubber latex (ca. 20% solution in ammonia) and 400 mg sodium lauryl sulfate. A film was cast from the hot sol whose properties are shown in Table 1 (entry 7). It can be seen that the film has lower transparency than the film without rubber latex while tensile strength is marginally lower and elongation ca. 3-fold higher. The water vapour permeability was also found to be lower (0.03 kg $m^{-2}$ $h^{-1}$.bar vs. 0.09 kg $m^{-2}$ $h^{-1}$.bar for control film of similar thickness) than of the film without rubber latex.

EXAMPLE 17

Into the hot centrifuged sol prepared as described in Example 11, rubber latex was added in the same proportion and same manner as described in Example 16. A film was cast from the hot sol whose properties are shown in Table 1 (entry 8). It can be seen that the film has lower transparency than the control film without rubber latex but the clarity is nevertheless higher than found with the film of Example 16. The tensile strength and % elongation were higher than obtained with the control. The water vapour permeability was also lower (0.05 kg $m^{-2}$ $h^{-1}$.bar vs. 0.09 kg $m^{-2}$ $h^{-1}$.bar for control film of similar thickness) than with control, as seen in Example 16 as well.

Examples 16 and 17 teach that natural rubber latex imparts superior characteristics to the film except for a reduced transparency. The films prepared with purified semi-refined carrageenan however have two-fold higher transparency and tensile strength than equivalent films prepared with refined carrageenan.

EXAMPLE 18

Films were prepared as per the process of examples 10, 11 and 17 (for the rubber latex-containing formulation, the amount of latex added was 0.12 ml instead of the 0.35 ml in Example 17). These films were pulse heat sealed to make small pouches and 20 ml of cotton seed oil, hexane, dichloromethane and acetone were poured into the pouches which were then heat sealed. The loss of weight was monitored after 120 h and the data are presented in Table 2. No obvious change in the film properties was discernible except in the case of acetone.

This example teaches that it is possible to use films of this invention for storage of non-aqueous fluids, particularly fluids which do not adversely affect film properties and/or leach away constituents of the film. The example further teaches us that films made from purified semi-refined carrageenan have superior barrier properties and reduce solvent loss and such loss is further reduced when natural rubber latex is incorporated in the formulation.

EXAMPLE 19

The film of Example 12 having high transparency was used for writing with marker pens used for overhead projection. The film was found to be suitable for overhead projection.

The main advantages of the present invention are:

(i) Use of inexpensive semi-refined carrageeenan as film forming material would greatly reduce film cost.

(ii) Semi-refined carrageenan is prepared in a more energy efficient and eco-friendly manner than refined carrageenan and, therefore, films prepared with semi-refined carrageenan are "greener".

(iii) Purification of semi-refined carrageenan is done in the sol state and the same sol is used for film preparation, i.e., the only additional operation involved in utilizing semi-refined carrageenan in place of refined kappa carrageenan is the centrifugation step at the film producer's end.

(iv) Seaweed debris obtained upon centrifugation can be utilized as soil conditioner.

(v) As with refined potassium kappa carrageenan, there is no requirement of gelling salt in the composition.

(vi) Tensile strength of the film prepared with semi-refined carrageeenan is the same as that obtained with refined potassium kappa carrageenan and 1.5–2.5 times higher than with other refined kappa carrageenan salts that are typically employed along with KCl as gelling salt.

(vii) The main components of the film, namely semi-refined carrageenan, glycerol and natural rubber latex, are of vegetable origin.

(viii) The neutral-to-alkaline pH of the film-forming composition prevents hydrolytic degradation of the polysaccharide.

TABLE 1

Properties of semirefined and refined kappa carrageenan based thin films

| Entry No. | Example No. | Appearance | Thickness (mm) | % Transmittance | Tensile strength (Kgf/cm$^2$) Length | Tensile strength (Kgf/cm$^2$) Breadth | Elongation (%) Length | Elongation (%) Breadth |
|---|---|---|---|---|---|---|---|---|
| 1 | 10 | Translucent and off color | 0.19 | 36.6 | 56.65 | 53.70 | 103.1 | 106.1 |
| 2 | 10 | Translucent and off color | 0.26 | 30.6 | 61.37 | 60.90 | 117.00 | 118.10 |
| 3 | 11 | More transparent and colorless | 0.18 | 85 | 75.53 | 71.40 | 77.74 | 78.40 |
| 4 | 11 | More transparent and colorless | 0.28 | 80.6 | 89.69 | 87.40 | 133.9 | 137.0 |
| 5 | 12 | Colorless and highly transparent | 0.18 | 96 | 141.63 | 141.0 | 161.78 | 165.0 |
| 6 | 12 | Colorless and highly transparent | 0.29 | 92 | 169.95 | 168.10 | 114.10 | 115.0 |
| 7 | 16 | Low transparency and off color | 0.18 | 18.8 | 49.57 | 46.43 | 291.99 | 291.11 |
| 8 | 17 | Translucent and colorless | 0.18 | 34.6 | 106.22 | 104.10 | 112.1 | 115.24 |

TABLE 2

| Non-aqueous fluid type | Weight Loss (%) Refined Carrageenan | Weight Loss (%) Purified Semi-Refined Carrageenan | Weight Loss (%) Purified Semi-refined carrageenan/rubber latex |
|---|---|---|---|
| Cotton seed oil | Nil | Nil | — |
| Hexane | 2.52 | 1.86 | 1.56 |
| Dichloromethane | 3.72 | 2.01 | 1.68 |
| Acetone | 3.81 | 3.10 | 2.81 |

(ix) The films can replace animal gelatin in soft capsules.

(x) The films can be made into pouches that have adequate strength and inertness to be of potential use as packaging material for solids and non-aqueous fluids, including vegetable oil and even organic solvents.

(xi) The films can be heat sealed immediately after casting when the purified semi-refined carrageenan content of formulations is 8–20% and the amount of plasticizer is 15–30%.

(xii) The film can be converted back into sol and reused in case there are any film defects.

We claim:

1. A process for the preparation of cost effective and eco-friendly semi refined kappa carrageenan (SRC) based biodegradable thin films, the process comprising:

(i) heating semi-refined kappa carrageenan in water to obtain a crude sol;
(ii) centrifuging the sol under hot condition to remove debris and obtain purified semi refined carrageenan (P-SRC) in the form of a clear sol;
(iii) concentrating the clear sol by boiling in an open pan evaporator to obtain a concentrated formulation;
(iv) adding a plasticizer comprising glycerol to the formulation to obtain a formulated sol;
(v) casting a film from the formulated sol.

2. A process as claimed in claim 1 wherein the film is recycled if defective, by conversion into a sol.

3. A process as claimed in claim 1 wherein the semi-refined kappa carrageenan is obtained by washing dry *Kappaphycus alvarezii* with water followed by cooking with 8% (w/v) KOH at a temperature in the range of 75–80° C. for a time period of about 3 hours, followed by recycling excess KOH to a subsequent batch after making up strength of KOH, and washing off residual KOH from product obtained, to obtain semi-refined kappa carrageenan.

4. A process as claimed in claim 3 wherein the semi-refined kappa carrageenan has a gel strength in the range of 500–650 g/cm$^2$ when measured in 1% carrageenan gel in 1% KCl at 3° C.

5. A process as claimed in claim 1 wherein the sol is prepared at a temperature in the range of 80–120° C. and in a time range of 5 to 30 minutes.

6. A process as claimed in claim 1 wherein the concentration of the semi-refined kappa carrageenan in step (i) is in the range of 1.5 to 15%.

7. A process as claimed in claim 1 wherein in step (ii) the hot sol having temperature in the range 70–100° C. is centrifuged at 1000–10000 rpm either in a batch of continuous centrifuge.

8. A process as claimed in claim 1 wherein centrifugation in step (ii) results in the formation of debris containing adhering sol, which is recycled to a next batch.

9. A process as claimed in claim 8 wherein the debris in the semi refined kappa carrageenan is removed by centrifugation at 10000 rpm at 80–85° C. for 10 min.

10. A process as claimed in claim 1 wherein the clear sol containing purified semi-refined kapa carrageenan is concentrated in step (iii) to a concentration in the range of 4–16% for film casting.

11. A process as claimed in claim 1 wherein the clear sol containing purified semi-refined kappa carrageenan is concentrated in step (iii) to a concentration in the range of 8–12% to achieve heat sealing immediately after film casting.

12. A process as claimed in claim 1 wherein the sue of gelling salt is avoided by the use of purified semi-refined kappa carrageenan.

13. A process as claimed in claim 1 wherein the glycerol is heated to a temperature in the range of 50–100° C. prior to addition into hot sol in step (iv) and the weight ratio of glycerol to purified semi-refined kappa carrageenan is 0.5–3.0 and more particularly 1.8–2.2.

14. A process as claimed in claim 1 wherein polyvinyl alcohol in solution form is added to the formulation obtained in step (iv).

15. A process as claimed in claim 14 wherein the molecular weight of polyvinyl alcohol added is in the range of 10000–20000 and the weight ratio of polyvinyl alcohol to purified semi-refined kappa carrageenan is 0.0–2.0.

16. A process as claimed in claim 1 wherein the natural rubber latex is added in the form of a dilute solution into the formulated hot sol.

17. A process as claimed in claim 16 wherein the natural rubber latex is first added in a concentration in the range of 15–25% to dilute ammonia and then further diluted 20–100 fold by adding to an aqueous solution containing 1–10% of an anionic sufactant comprising sodium lauryl sulphate and then warmed to a temperature of 50–60° C. prior to addition to hot sol.

18. A process as claimed in claim 16 wherein the ratio of rubber to purified semi-refined kappa carrageenan is in the range of up to 0.040.

19. A process as claimed in claim 1 wherein the formulated sol is degassed prior to casting to avoid film defects due to trapped air bubbles.

20. A process as claimed in claim 1 wherein the temperature at which films are cast in step (v) is in the range of 50–100° C. and viscosity is in the range of 100–500 cp.

21. A process as claimed in claim 1 wherein the moisture content of the film immediately after casting in step (v) is in the range of 50–90%.

22. A process as claimed in claim 1 wherein the moisture content of the film immediately after casting in step (v) is in the range of 55–60%.

23. A process as claimed in claim 1 wherein moisture content of film is between 10–60%.

24. A process as claimed in claim 1 wherein the thickness of film obtained is in the range of 50–2000 µm.

25. A process as claimed in claim 1 wherein the tensile strength of films is in the range of 100–1000 kgf/cm$^2$ and % elongation is in the range of 50–350%.

26. A process as claimed in claim 1 wherein the water vapour permeability of the thin films is in the range of 0.01–0.15 kg/m$^2$/h.bar.

27. A process as claimed in claim 1 wherein the film obtained is non-tacky, ordorless, and colorless and % transmittance of light of 610 nm frequency is in the range of 10–99%.

28. A process as claimed in claim 1 wherein the semi-refined kappa carrageenan is used in the form of a 5% aqueous solution (w/w) of semi refined kappa carrageenan prepared by boiling in an autoclave at 110° C. at a pressure of 15 psi for 20 min.

29. A process as claimed in claim 1 wherein the clear sol has 4% carrageenan content and is concentrated in an open pan evaporator to increase carrageenan concentration to a range of 8–12%.

30. A process as claimed in claim 1 wherein the quantity of glycerol taken is in the range of 50%–150% of weight of kappa carrageenan.

31. A process as claimed in claim 1 wherein polyvinyl alcohol of MW 14,000 was added along with glycerol to improve the strength and clarity of the film, the amount of the polyvinyl alcohol being 50%–150% with respect to the weight of kappa carrageenan.

32. A process as claimed in claim 31 wherein natural rubber latex is added into the sol along with the glycerol and/or the polyvinyl alcohol, to the extent of 0.5–1.5% (w/w) with respect to the kappa carrageenan.

33. A process as claimed in claim 32 wherein the rubber latex was added into a 4% (w/v) aqueous solution of sodium lauryl sulphate and the solution was then added into the hot sol in a ratio of 1:9.

34. A process as claimed in claim 1 wherein the film is cast at 80–85° C. on a prototype casting machine.

35. A process as claimed in claim 1 wherein the film is peeled and dried in flat condition at room temperature (30° C.) to attain desired moisture level in the range of 65–20%.

36. A process as claimed in claim 1 wherein the film obtained is 100 cm long, 10 cm wide, and 0.18–0.28 mm thick.

37. A process as claimed in claim 1 wherein the film obtained has a tensile strength of 45 to 170 kg/cm$^2$ and elongation of 77 to 292% for film containing 8–10% moisture.

38. A process as claimed in claim 1 wherein the film obtained has substantially similar tensile strength and % elongation along both length and breadth thereof.

39. A process as claimed in claim 1 wherein water vapour permeability of the film is reduced from a range of 0.008–0–0.009 gcm$^{-2}$ h$^{-1}$ bar to a range of 0.003–0.005 gcm$^{-2}$ h$^{-1}$ bar by incorporation of natural rubber latex therein.

40. A process as claimed in claim 1 wherein one surface of the film is treated with a cross-linking agent to make the surface hydrophobic.

41. A process as claimed in claim 1 wherein the film obtained is converted into a pouch by pulse heat sealing at 100° C.

42. A process as claimed in claim 41 wherein during heat sealing glycerol is applied locally to a sealing area.

43. A process as claimed in claim 1 wherein the film is converted into a soft capsule.

44. A process as claimed in claim 1 wherein the films are fabricated into pouches for storage of solids in powder or granular form.

45. A process as claimed in claim 1 wherein the films are fabricated into pouches for packaging of non-aqueous edible fluids such as vegetable oils.

46. A process as claimed in claim 1 wherein the films are resistant to organic solvents selected from the group consisting of acetone, hexane and dichloromethane and are fabricated into packaging for storing such solvents.

47. A process as claimed in claim 1 wherein the film obtained is imprintable for use as overhead projection films.

* * * * *